United States Patent [19]
Glickman

[11] Patent Number: 5,675,777
[45] Date of Patent: Oct. 7, 1997

[54] ARCHITECTURE FOR MINIMAL INSTRUCTION SET COMPUTING SYSTEM

[75] Inventor: Jeff Bret Glickman, Champaign, Ill.

[73] Assignee: Hipercore, Inc., Champaign, Ill.

[21] Appl. No.: 445,973

[22] Filed: May 22, 1995

Related U.S. Application Data

[63] Continuation of Ser. No. 191,049, Feb. 1, 1994, abandoned, which is a continuation of Ser. No. 100,698, Jul. 30, 1993, abandoned, which is a continuation of Ser. No. 965,524, Oct. 23, 1992, abandoned, which is a continuation of Ser. No. 471,962, Jan. 29, 1990, abandoned.

[51] Int. Cl.$^6$ ................................ G06F 9/22; G06F 9/315
[52] U.S. Cl. .................. 395/561; 364/232.23; 364/258; 364/259; 364/259.8
[58] Field of Search ............................. 395/375, 800

[56] References Cited

U.S. PATENT DOCUMENTS

| | | | |
|---|---|---|---|
| 3,700,873 | 10/1972 | Yhap | 364/200 |
| 4,040,031 | 8/1977 | Cassonnet | 364/200 |
| 4,231,085 | 10/1980 | Bazlen et al. | 364/200 |
| 4,376,976 | 3/1983 | Lahti et al. | 364/200 |
| 4,442,488 | 4/1984 | Hall | 364/200 |
| 4,454,580 | 6/1984 | Page et al. | 364/200 |
| 4,566,063 | 1/1986 | Zolnowsky et al. | 364/200 |
| 4,569,016 | 2/1986 | Hao et al. | 364/200 |
| 4,589,065 | 5/1986 | Auslander et al. | 364/200 |
| 4,589,087 | 5/1986 | Auslander et al. | 364/200 |
| 4,594,659 | 6/1986 | Guenthner et al. | |
| 4,626,988 | 12/1986 | George | 364/200 |
| 4,635,194 | 1/1987 | Burger et al. | 364/200 |
| 4,714,994 | 12/1987 | Oklobdzija et al. | 364/200 |
| 4,729,093 | 3/1988 | Mothersole et al. | 364/200 |
| 4,734,852 | 3/1988 | Johnson et al. | |
| 4,739,471 | 4/1988 | Baum et al. | |
| 4,761,731 | 8/1988 | Webb | 364/200 |
| 4,766,566 | 8/1988 | Chuang | 364/200 |
| 4,803,620 | 2/1989 | Inagami et al. | 364/200 |
| 4,851,990 | 7/1989 | Johnson et al. | |
| 4,926,323 | 5/1990 | Baror et al. | |
| 5,050,068 | 9/1991 | Dollas et al. | 395/375 |
| 5,201,056 | 4/1993 | Daniel et al. | 395/800 |

Primary Examiner—Kevin J. Teska
Assistant Examiner—Ayni Mohamed
Attorney, Agent, or Firm—Brinks Hofer Gilson & Lione

[57] ABSTRACT

A computing system architecture that uses a minimal instruction set for the functioning of a general purpose computing system as well as applying completely unencoded instructions from memory directly to the hardware is herein described. The present invention additionally uses a flowthrough design to further reduce the hardware complexity to provide a streamlined and extremely efficient architecture.

8 Claims, 6 Drawing Sheets

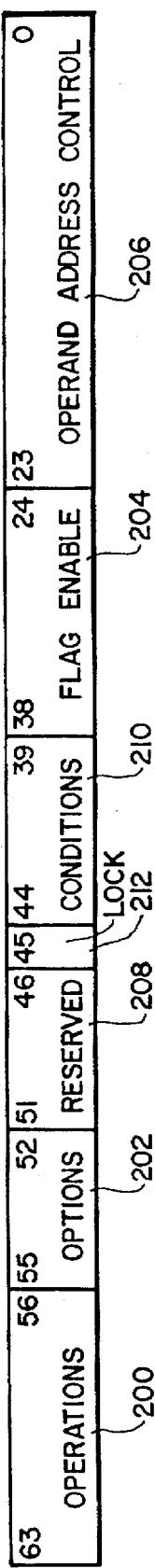
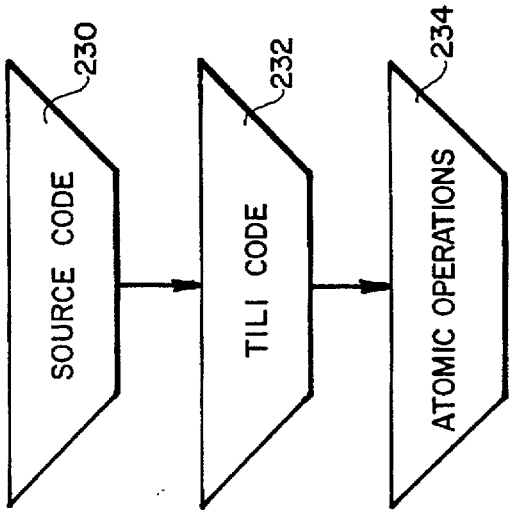
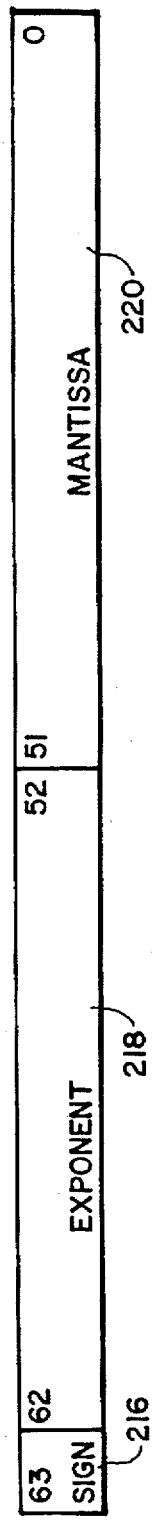
Fig. 6
Fig. 7
Fig. 8

ARCHITECTURE FOR MINIMAL INSTRUCTION SET COMPUTING SYSTEM

This application is a continuation of application Ser. No. 08/191,049, filed Feb. 1, 1994, now abandoned, which is a continuation of application Ser. No. 08/100,698, filed Jul. 30, 1993, and now abandoned, which is a continuation of application Ser. No. 07/965,524 of Oct. 23, 1992, now abandoned, which was a continuation of application Ser. No. 07/471,962 filed Jan. 29, 1990, which is now abandoned.

FIELD OF THE INVENTION

The present invention relates to programmable digital computing systems. In particular, the invention relates to a digital computing system architecture that uses a minimal instruction set and minimal control circuitry to process data at significantly high rates of speed.

BACKGROUND OF THE INVENTION

One of the fundamental goals in any computer system architecture is to minimize the time the system takes to complete a given task. This performance measurement may be represented by the product of the number of instructions required to do the task, the duration of the clock cycle, and the average number of clock cycles per instruction execution.

One traditional type of computer design strives to minimize the number of instructions required to complete the task with powerful instructions. Many such computing systems implement a complex instruction set, known as Complex Instruction Set Computer (CISC) architecture. In this arrangement, the system is designed to minimize memory storage by using instructions as pointers to stored control signals in the form of microprograms in read-only memory (ROM).

For example, the central processing unit (CPU) of this system may be partitioned into control and data processing units wherein the control unit provides control signals to the data processing unit for selection and sequencing of data processing operations. In many such arrangements, the control unit operates in a two-step fetch-execute cycle. In the fetch step, an instruction is obtained from memory and a decoder determines the nature of the instruction. The execute step thereafter carries out the necessary operations for manipulation of data through the data processing unit.

The data processing unit of these systems performs arithmetic and logical operations on data supplied thereto in response to decoded control unit signals. In traditional systems, the data processing unit, or arithmetic logic unit, is designed to provide the maximum number of operations using the fewest number of gates. Accordingly, the overall propagation delay through the data processing unit is high.

The control unit function is provided by a microprogram wherein a sequence of operations perform specific tasks that are much more elementary than the machine instruction fetched from memory. A microprogram sequencer, the equivalent of a program counter at the microprogram level, sequentially locates the address of the macroinstruction in ROM and thereafter provides the microinstructions for directly controlling functions at desired points within the CPU. The instruction code, therefore, is quite complex which results in multiple clock cycles to complete the task. Accordingly, the most sophisticated CISC systems are able to achieve a performance of executing approximately 17 million instructions per second (MIPS).

A simpler architecture has been described in Reduced Instruction Set Computer (RISC) systems. Such systems utilize a smaller instruction set which have instructions designed to reduce the number of clock cycles per instruction execution as well as to reduce the instruction decode cycle. For example, many RISC systems are designed to average about one clock cycle to execute an instruction. This arrangement provides simpler and faster fetch and decode hardware than found in the traditional CISC architecture.

The RISC instruction set also seeks to minimize address modes and instruction formats. RISC systems use load/store architecture to support the reduction of the instruction set. Thus, only the load and store instructions, which operate to move data between registers and memory, can access memory. The simplification results in an increased amount of code required to perform an operation in comparison to CISC systems. In modern microprocessors, however, computation is faster than memory access. Thus, for example, in RISC machines, load or store instructions will be started in one machine cycle, and in the next cycle while the load and store is in progress, the RISC CPU can execute the next instruction.

In comparison with CISC systems, the relative simplicity of the instruction set partially eliminates the need for microcode in the CPU in selected RISC systems. With use of this approach, RISC systems approach an execution performance of approximately 33 MIPS, significantly greater compared to CISC systems. However, instruction decoding circuitry must still decode the sequences of low-level operations of the RISC system. In addition, the execution rate of such systems is limited by the number of instructions supported by the processor. Thus, while such prior art systems may function satisfactorily under certain conditions, they are still quite complex.

OBJECTS OF THE INVENTION

Accordingly, a general object of the present invention is to provide an improved architecture for a digital computing system that overcomes the deficiencies of the prior art.

Similarly, an object of the present invention is to provide a digital computing system architecture that greatly increases execution speed.

A further object of the present invention is to provide a computing system architecture which utilizes a minimal instruction set to implement as few instructions as possible in hardware.

An additional object of the present invention is to provide a computing system architecture that uses direct instruction control wherein an instruction code from memory directly stimulates control lines in the hardware to eliminate the instruction decoding step and to simplify the hardware design.

It is another object of the present invention to provide a computing system architecture that uses a data flow-through design for the hardware to minimize undesirable characteristics of a synchronously clocked signal.

It is an additional object of the present invention to provide the functionality traditionally found in microcode with software to enhance user flexibility.

Other objects and advantages of the invention will become apparent upon reading the following description and appended claims, and upon reference to the accompanying drawings.

SUMMARY OF THE INVENTION

These objects are achieved with a computing system architecture that uses a small streamlined instruction set that operates at higher speeds than other known techniques. In addition, the invention applies unencoded instructions directly from memory to a processing means to provide computational paths for data to flow therethrough. The method according to the present invention accomplishes this by manipulating data in a general purpose digital computing system having memory means, central processing means, and a bus network interconnecting the central processing means and memory means. An instruction word having source operands of data and, destination operand of data, and an instruction portion having bit portions therein attributable to a minimum instruction set is located. Selected bits of the instruction portion control streamlined computational paths in the central processing means. The bit portions of the instruction are applied directly to the central processing means. In this way, a result may be obtained therefrom and stored in a memory location attributable to the destination operand. The invention executes simple instructions at a very rapid processing speed to provide a performance advantage over conventional processing techniques. It has been found that such an arrangement may provide an execution performance of 185 MIPS.

BRIEF DESCRIPTION OF THE DRAWINGS

For a more complete understanding of this invention, reference should now be made to the embodiment illustrated in greater detail in the accompanying drawings and described below by way of an example of the invention. In the drawings:

FIG. 6 is a diagrammatic representation of a direct instruction control word in accordance with the present invention.

FIG. 7 is a diagrammatic representation of a software compilation sequence to provide the processor shown in FIG. 1 with an atomic operation from the minimum instruction set used in the present invention.

FIG. 8 is a diagrammatic representation of a floating point number in accordance with the present invention.

DETAILED DESCRIPTION OF THE PREFERRED EMBODIMENT

Figure 1:
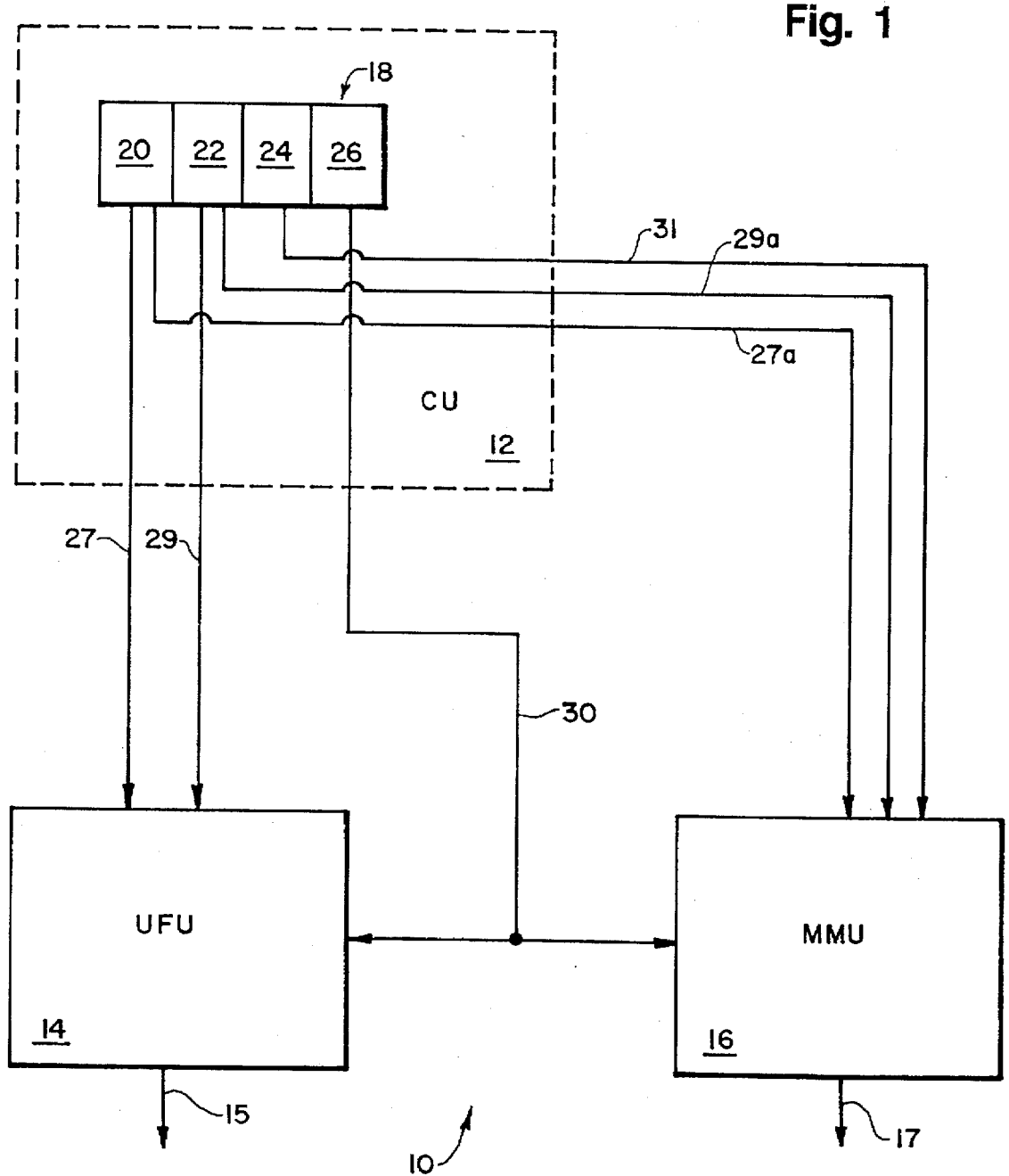
FIG. 1 is a simplified block diagram representation of the computing system architecture of the present invention implemented in a processor.

The following detailed description will permit a more complete understanding of this invention. However, the embodiment described below is simply an example of the invention, and the invention is not limited to this embodiment. It will be understood that the architecture of the present invention may be implemented with the use of various configurations of processors with appropriate modification. Accordingly, the specific configuration of the processor hereinafter described provides a nonlimiting example of one implementation of the present invention. It will be further understood, that in certain instances, details may have been omitted which are not necessary for an understanding of the present invention.

Generally, the present invention relates to a high speed computing system architecture. The architecture is conceptually understood as a computing machine that compiles directly from a high level language to direct instruction control words providing the functional equivalent of microcode. The present invention uses a two-layer instruction set that compiles from a high level language to atomic instructions, which contain the functionality of microcode. The apparatus and method of the present invention use this simplified atomic instruction set to reduce the complexity of control circuitry in the processor. Inasmuch as the functionality traditionally found in microcode has been transferred to the atomic instruction set, the software complexity of the present invention is increased in comparison to traditional computer architectures.

One very important feature of the invention is that instruction sequencing is not required. This arrangement directly results in significantly higher performance. Thus, for example, the invention eliminates macro or micro instructions as well as microprogram sequencing. In addition, the invention operates without decoding the instruction obtained from memory. The absence of an intermediate decoding step as well as the absence of microprogram sequencing enhances the minimization of control circuitry. The minimal amount of control circuitry needed significantly reduces the size of the processor permitting highly increased processor density. The invention does however, require an increased amount of memory in comparison to known CISC or RISC systems.

The system further uses an instruction word that contains operand data or address information, operation information and control. The device of the present invention stores unencoded instruction words in memory to provide bits which directly stimulate control lines in the hardware. The instruction word provides control bits, directly from memory, that control the data flow-through paths for the functional units, described in detail herein. In addition to controlling the functional units, the instruction word also contains the data operands and branching and trap control.

The architecture of the present invention is simplified to provide all of the necessary arithmetic and logical operations with functional units designed for minimal propagation delay therethrough. It will also be appreciated that the architecture contemplated by the present invention utilizes minimized access to registers. For example, there are no general purpose registers provided in a preferred embodiment.

Turning now to the drawings, FIG. 1 shows a simplified block diagram representation of a processor 10 implementing the streamlined architecture of the present invention. The processor 10 is composed of three components preferably arranged on a single chip: a control unit (CU) 12, a universal functional unit (UFU) 14, and a memory management unit (MMU) 16. Of course, different arrangements for the processor 10 may occur to those skilled in the art to which this invention pertains. According to one preferred embodiment, the MMU 16 provides an interface between the processor 10 and user memory. The UFU 14 provides five functional units that perform the arithmetic and logical operations traditionally found in an arithmetic logic unit. The CU 12 provides an instruction pipeline that supplies the UFU 14 and provides control for timing circuitry in the processor 10.

In accordance with the present invention, a direct instruction control word 18 is fetched from memory. The instruction control word 18 of a preferred embodiment comprises 256 bits having four 64-bit segments: two source operands, shown as segments 20 and 22, a destination operand shown as segment 24, and an instruction segment 26. The information contained in the source operand segments 20 and 22 may specify actual values upon which an operation is to be performed, the addresses of such values, an offset value to be added to an address already stored in an index register in the MMU 16, or an address on a register bus (shown in FIGS. 3 and 4 as numeral 77). As with the source operand segments, the destination operand segment 24 contains address information; the destination operand segment, however, may not have a value stored therein.

The opcode in the instruction segment 26 is completely unencoded, so that the instruction segment 26 directly provides control bit signals to the control unit 12. The control unit 12 appropriately applies control bit signals of the instruction segment 26 to control the computational paths for the source operand segments 20 and 22 and apply the same control directly to the computational elements of the universal functional unit 14 via a line 30. In this manner, the source operand segments 20 and 22 are applied to the UFU 14 via lines 27 and 29. When the UFU 14 has completed-manipulation of the source operand segments 20 and 22, a result may be written to memory or to a register on a line 15. This arrangement eliminates microcode sequencing found in traditional architectures. In those systems, an opcode represents an entry point into microcode which thereafter determines the movement of data to effect an operation.

The control unit 12 concurrently applies control bits in the instruction segment 26 via line 30 to control the MMU 16 for the receipt of address information of the source operand segments 20 and 22 and the destination operand segment 24. The MMU 16 thereby receives this address information via lines 27a, 29a and 31 and performs necessary indexing and translation operations thereon in accordance with control signals provided by the instruction segment 26. The MMU 16 addresses memory via a line 17.

Turning now to FIG. 6, therein is shown a diagrammatic representation of the instruction segment 26 of direct instruction control word 18. The instruction segment 26 comprises 64 bits in one preferred embodiment having a portion partitioned into an operation bit section 200 used to specify a desired operation.

One very important feature of the present invention is the use of a minimum instruction set comprising seven pure atomic instructions which define the operations performed by the processor 10. The minimum instruction set allows the absence of decoding in the instruction control word 18 by reducing the word 18 to a manageable size. This is accomplished by assigning a particular bit in the operation bit section 200 to one atomic instruction. The minimum instruction set also reduces the hardware complexity of the processor 10 inasmuch as the processor 10 has fewer instructions to support. These atomic instructions, shown in Table 1 below, enable the processor 10 to perform all the tasks of a general purpose computer:

TABLE 1

MINIMUM INSTRUCTION SET

| Instruction | Description |
| --- | --- |
| SUM | Add (Subtract) |
| PROD | Multiply |
| SHIFT | Shift left or right: arithmetic, logical, |

TABLE 1-continued

MINIMUM INSTRUCTION SET

| Instruction | Description |
| --- | --- |
| | or rotate; or sticky right |
| LOGIC | Logical AND, OR, NAND, NOR, XNOR, XOR |
| TRAP | Trap |
| UNPACK | Floating Point Unpack |
| PACK | Floating Point Pack |

It will be appreciated that the minimum instruction set performs integer arithmetic, logical, floating-point arithmetic, and control operations. Appropriate software modification permits the processor 10 to combine these atomic instructions to perform other instructions as well.

For example, twelve other low-level instructions may be implemented by setting bits in an option bit section 202 of the instruction segment 26. By so doing, a subtract instruction is implemented wherein the addition instruction adds the 2's complement of the data operand segment 22 with the data operand segment 20. Similarly, bits in the option section 202 may be set to provide a logical shift right or left instruction, an arithmetic shift right or left instruction, a rotate left or right instruction, and a sticky right instruction used for floating point operations. In addition, bits in the option bit section 202 may be set to provide logic AND, OR, XOR, NAND, NOR and XNOR operations.

Atomic operations may be locked together to form new indivisible psuedo-instructions through the use of the LOCK instruction locking prefix. The presence of a bit 212 in the instruction segment 26 corresponding to a lock instruction dictates a sequence, or a series of multiple atomic instructions in a noninterruptable entity. Since locked instructions cannot be interrupted, the processor 10 will not process an interrupt until the last instruction of the locked set is finished. Thus, any other computer instruction can be made from combinations of the atomic instructions.

The following table provides a description of the atomic operations performed by the present invention along with corresponding options.

TABLE 2

| INSTRUCTION | DESCRIPTION | OPTION |
| --- | --- | --- |
| SUM | Addition/Subtraction | Add/Subtract |
| PROD | Multiplication | None |
| SHIFT | Shift | Left/Right, Logical/ Arithmetic, Rotate, Sticky Right |
| LOGIC | Logical | AND, OR, NAND NOR, XNOR, XOR |
| TRAP | Trap | None |
| UNPACK | Floating Point Unpack | Sum/Product |
| PACK | Floating Point Pack | Sum/Product |

In the preferred embodiment, seven bits designate the atomic operations in the operation section 200 of the instruction segment 26. The SUM, PRODUCT, LOGIC, SHIFT, UNPACK, PACK and TRAP atomic operations are assigned to bits 56 through 63, respectively, of the instruction segment 26. An escape operation, which prevents the processor 10 from attempting to execute an instruction, is assigned to bit 63.

Four bits designate operation options in the option bit section 202 of the instruction segment 26 and have overlapping bit functions for various operations. When the LOGIC operation bit is selected, the NOT, AND, OR, and XOR options are assigned to bits 52 through 55, respectively. When the SUM operation bit is selected, the addition or subtraction mode option is assigned to bit 52. When the SHIFT operation is selected, left/right, logical/arithmetic, rotate and sticky right options are assigned to bits 52 through 55, respectively. When FLOATING POINT UNPACK is selected, the sum/product option is assigned to bit 52. When FLOATING POINT PACK is selected, the sum/product is also assigned to bit 52.

The following is a description of the atomic instruction operations performed by the present invention wherein "Usrc" designates an unrestricted source, "Udst" designates an unrestricted destination, "Msrc" designates a memory source, "Mdst" designates a memory destination, "Fsrc" designates a floating point register source (shown as numeral 82 in FIG. 3), and "Fdst" designates a floating point register destination. It will be understood that, for example, "Usrc1," "Mscr1" or "Fsrc1" refers to source operand segment 20, "Usrc2," "Mscr2" or "Fsrc2" refers to source operand segment 22 and "Udst," "Mdst" or "Fdst" refers to destination operand segment 24.

1. Integer Addition (Udst)#(Usrc1)+(Usrc2)

The atomic addition operation performs a two's complement addition. The data at the sources Usrc1 and Usrc2 are added together and their sum overwrites the data at the destination Udst.

2. Integer Subtraction (Udst)#(Usrc1)−(Usrc2)

The atomic integer subtraction operation subtracts the data at source Usrc2 from the data at source Usrc1. The data at both Usrc1 and Usrc2 are assumed to be in 2's complement representation. The result overwrites the data at the destination Udst.

3. Integer Multiplication (Udst)#(Usrc1)×(Usrc2)

The atomic multiplication operation multiplies the data at source Usrc1 by the data at source Usrc2. The 64 least significant bits of this result overwrite the data at the destination. Bit 65 of the result is copied to the carry flag. If any of the 63 most significant bits are set, the overflow flag is set. Otherwise, the 64 most significant bits are discarded. The data at the sources Usrc1 and Usrc2 are assumed to be in 2's complement notation. The result of the multiplication is in 2's complement notation.

4. Shift Left (Logical)

(Udst)#(Usrc1) FF (Usrc2)

The atomic logical shift left operation shifts the data at source Usrc1 left by the shift distance specified by the data at source Usrc2. Zeros are shifted in on the right. The result overwrites the data at destination Udst. If the data at Usrc2 is negative, an effective logical shift right occurs by the absolute value of the number of the shift distance specified by Usrc2. The shift distance used is (Usrc2)%64; i.e. only the 6 least significant bits of (Usrc2) are used for the shift distance.

5. Shift Right (Logical)

(Udst)#(Usrc1) ff (Usrc2)

The atomic logical shift right operation shifts the data at source Usrc1 right by the shift distance specified by the data at source Usrc2. Zeros are shifted in on the left. The result overwrites the data at destination Udst. If the data at Usrc2 is negative, an effective logical shift left occurs by the absolute value of the number of the shift distance specified by Usrc2. The shift distance used is (Usrc2)%64; i.e. only the 6 least significant bits of (Usrc2) are used for the shift distance.

6. Shift Left (Arithmetic)

(Udst)←(Usrc1)<<(Usrc2) with sign extension

The atomic arithmetic shift left operation shifts the data at source Usrc1 the shift distance specified by the data at source Usrc2. Copies of the least significant bit of Usrc1 are shifted in from the right. The result overwrites the data at destination Udst. If the data at Usrc2 is negative, an effective arithmetic shift right occurs by the absolute value of the number of the shift distance specified by Usrc2%64; i.e. only the 6 least significant bits of (Usrc2) are used for the shift distance.

7. Shift Right (Arithmetic)

(Udst)←(Usrc1)>>(Usrc2) with sign extension

The atomic arithmetic shift right operation shifts the data at source Usrc1 by the shift distance specified by the data at source Usrc2. Copies of the most significant bit of Usrc1 are shifted in from the left (sign extension). The result overwrites the data at destination Udst. If the data at Usrc2 is negative, an effective arithmetic shift left occurs by the absolute value of the number of the shift distance specified by Usrc2. The shift distance used is (Usrc2) %64; i.e. only the 6 least significant bits of (Usrc2) are used for the shift distance.

8. Shift Right (Rotate)

(Udst)←(Usrc1) rotated right (Usrc2) bits

The atomic rotate right operation rotates the data at source Usrc1 right by the distance specified by the data at source Usrc2. The result overwrites the data at destination Udst. If the data at Usrc2 is negative, a rotate left occurs by the absolute value of the distance specified by Usrc2. The distance used is (Usrc2)%64; i.e. only the 6 least significant bits of (Usrc2) are used for the rotate distance.

9. Shift Left (Rotate)

(Udst)←(Usrc1) rotated left (Usrc2) bits

The atomic rotate left operation rotates the data at source Usrc1 left by the distance specified by the data at source Usrc2. The result overwrites the data at destination Udst. If the data at Usrc2 is negative, a rotate right occurs by the absolute value of the distance specified Usrc2. The distance used is (Usrc2)%64; i.e. only the 6 least significant bits of (Usrc2) are used for the rotate distance.

10. Shift Right Arithmetic Sticky

A sticky right shift also performs a right shift on the operand; if any of the discarded bits of the original are ones, the least significant bit of the result becomes a one (regardless of the value it would otherwise have). The sticky right and arithmetic right shifts can be performed simultaneously on the same operand.

11. Logical AND (Udst)←(Usrc1) AND (Usrc2)

The data bits of the source at Usrc1 are AND'ed with the bits of the data source Usrc2. The result overwrites the data at destination Udst.

12. Logical OR (Udst)←(Usrc1) OR (Usrc2)

The data bits of the source at Usrc1 are OR'ed with the bits of the data at source Usrc2. The result overwrites the data at destination Udst.

13. Logical NAND (Udst)←(Usrc1) NAND (Usrc2)

The data bits of the source at Usrc1 are NAND'ed with the bits of the data at source Usrc2. The result overwrites the data at destination Udst.

14. Logical NOR (Udst)←(Usrc1) NOR (Usrc2)

The data bits of the source at Usrc1 are NOR'ed with the bits of the data at source Usrc2. The result overwrites the data at destination Udst.

15. Logical XNOR (Udst)←(Usrc1) XNOR (Usrc2)

The data bits of the source at Usrc1 are XNOR'ed with the bits of the data at source Usrc2. The result overwrites the data at destination Udst.

16. Floating Point Unpack (Fdst)←(Usrc1), (Usrc2)

This atomic operation unpacks two floating point numbers at source Usrc1 and Usrc2 into the destination Fdst, a point floating register file 82 (shown in FIG. 3), and is described in greater detail herein.

17. Floating Point Pack (Udst)←Pack (Usrc1), (Usrc2)

This atomic operation packs an integer manitssa and exponent at source Usrc1 and Usrc2, into the destination Udst, and is described in greater detail herein.

18. Trap

The atomic trap instruction executes a software interrupt. The contents of the program counter register are saved in a program counter shadow register in the program counter control circuit (numeral 80 in FIG. 4). The contents of the processor status register (numeral 72 in FIG. 3) are saved in a processor status shadow register (also numeral 72). The address of the common entry point of all trap routines is placed in the program counter 80. A source operand segment 20 or 22 is placed in an interrupt vector register in the interrupt control circuit (numeral 44 of FIG. 2) to indicate the type of trap being taken.

A flag enable bit section 204 is also provided in the instruction segment 26 to accommodate a variety of user modes. The flag enable bit section 204 advantageously permits a particular flag to be modified or not modified on an individual instruction basis.

The flag enable designations in the flag enable bit section 204 for floating point operations: Zero (FZ), Negative (FN), Overflow (FV), Underflow (FU), Infinity (FInf), Not a Number (FNaN), Unnormal (FUnN), Inexact (FInx), Invalid Operation (FInO), Divide By Zero (FDvZ) and Unordered (FUnO) are assigned to bits 28 through 38 respectively. The flag enable designations for Integer Operations: Zero (Z), Negative (N), Overflow (V), and Carry (C), are assigned to bits 24 through 27 respectively.

Figure 3:
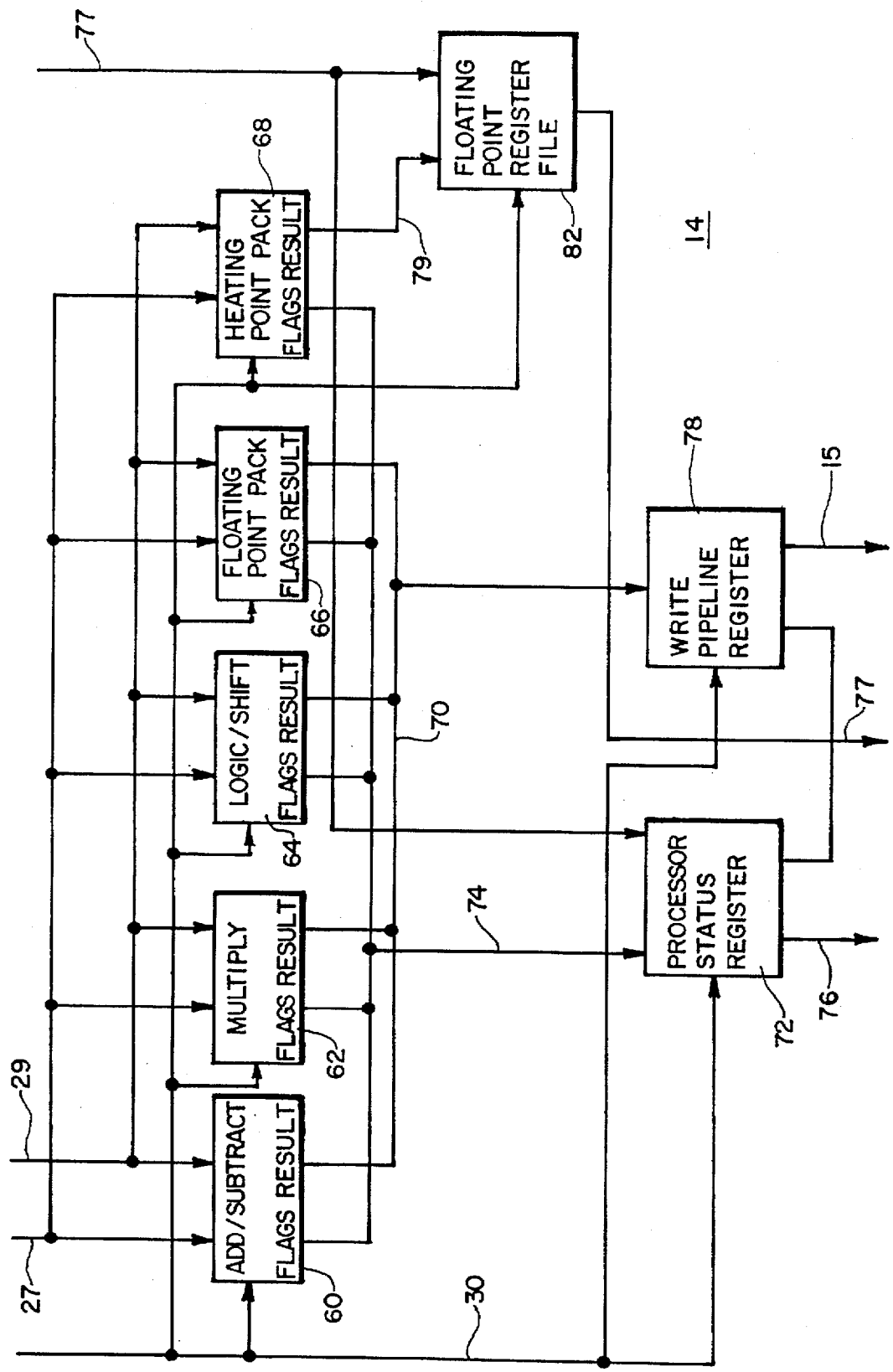
FIG. 3 is a block diagram representation of the universal functional unit of the processor shown in FIG. 1.

The instruction segment 26 contains a condition bit field 210 that determines whether or not the result of a computation performed by the UFU 14 should be written, based on the contents of flag bits in a processor status register (shown as numeral 72 in FIG. 3). If the condition specified in the bit field 210 of instruction segment 26 is met, then the result of the computation will be written to the address specified by the destination operand segment 24. Otherwise, the result is not written. This feature provides the functionality of conditional and unconditional jump instructions of a traditional computer. To perform an unconditional jump, the destination of the write is a program counter register (shown in FIG. 4 as numeral 80) and the conditional bit field 210 contains a bit pattern which specifies the condition that must be met by the contents of the processor status register 72 for the write to take place. One advantage of such an arrangement is that any memory location or register can be the destination of such a conditional write operation. The use of this option is not restricted to use with only the program counter register 80 as the destination. The condition designations in the condition bit field 210 may be set as follows:

TABLE 3

| Bit | | | | | | |
|---|---|---|---|---|---|---|
| 44 | 43 | 42 | 41 | 40 | 39 | Description |
| 0 | 0 | 0 | 0 | 0 | 0 | always |
| 0 | 0 | 0 | 0 | 0 | 1 | never |
| 0 | 0 | 0 | 0 | 1 | 0 | N set |
| 0 | 0 | 0 | 0 | 1 | 1 | N clear |
| 0 | 0 | 0 | 1 | 0 | 0 | Z set |
| 0 | 0 | 0 | 1 | 0 | 1 | Z clear |
| 0 | 0 | 0 | 1 | 1 | 0 | C set |
| 0 | 0 | 0 | 1 | 1 | 1 | C clear |
| 0 | 0 | 1 | 0 | 0 | 0 | V set |
| 0 | 0 | 1 | 0 | 0 | 1 | V clear |
| 0 | 0 | 1 | 0 | 1 | 0 | GE (greater than or equal to) |
| 0 | 0 | 1 | 0 | 1 | 1 | LT (less than) |
| 0 | 0 | 1 | 1 | 0 | 0 | GT (greater than) |
| 0 | 0 | 1 | 1 | 0 | 1 | LE (less than or equal to) |
| 0 | 0 | 1 | 1 | 1 | 0 | HI (higher) |
| 0 | 0 | 1 | 1 | 1 | 1 | LOS (lower) |
| 0 | 1 | 0 | 0 | 0 | 0 | FDvZ set |
| 0 | 1 | 0 | 0 | 0 | 1 | FDvZ clear |
| 0 | 1 | 0 | 0 | 1 | 0 | FInO set |
| 0 | 1 | 0 | 0 | 1 | 1 | FInO clear |
| 0 | 1 | 0 | 1 | 0 | 0 | FInx set |
| 0 | 1 | 0 | 1 | 0 | 1 | FInx clear |
| 0 | 1 | 0 | 1 | 1 | 0 | FUuN set |
| 0 | 1 | 0 | 1 | 1 | 1 | FUnN clear |
| 0 | 1 | 1 | 0 | 0 | 0 | FInf set |
| 0 | 1 | 1 | 0 | 0 | 1 | FInf clear |
| 0 | 1 | 1 | 0 | 1 | 0 | FNaN set |

TABLE 3-continued

| Bit | | | | | | |
|---|---|---|---|---|---|---|
| 44 | 43 | 42 | 41 | 40 | 39 | Description |
| 0 | 1 | 1 | 0 | 1 | 1 | FNaN clear |
| 0 | 1 | 1 | 1 | 0 | 0 | FU set |
| 0 | 1 | 1 | 1 | 0 | 1 | FU clear |
| 0 | 1 | 1 | 1 | 1 | 0 | FV set |
| 0 | 1 | 1 | 1 | 1 | 1 | FV clear |
| 1 | 0 | 0 | 0 | 0 | 0 | FN set |
| 1 | 0 | 0 | 0 | 0 | 1 | FN clear |
| 1 | 0 | 0 | 0 | 1 | 0 | FZ set |
| 1 | 0 | 0 | 0 | 1 | 1 | FZ clear |
| 1 | 0 | 0 | 1 | 0 | 0 | FUnO set |
| 1 | 0 | 0 | 1 | 0 | 1 | FUnO clear |
| 1 through 1 | 0 | 0 | 1 | 1 | 0 1 | unused |
| 1 | 0 | 1 | 0 | 1 | 0 | FGE (floating point greater than or equal to) |
| 1 | 0 | 1 | 0 | 1 | 1 | FLT (floating point less than) |
| 1 | 0 | 1 | 0 | 1 | 1 | FLE (floating point less than or equal to) |
| 1 through 1 | 0 1 | 1 1 | 1 1 | 1 1 | 0 1 | unused |

Finally, an address control section 206 of instruction segment 26 provides control for the source operand segments 20 and 22 and destination segment 24. The remaining bit section 208 is reserved.

Control in the address control section 206 for the source operands 20 and 22 is the same. This control specifies if a data control bit is enabled and whether the operand is immediate or direct. If the operand is direct, whether an index is needed is determined. If an index is needed, control must select a desired index register. The control also specifies if the operand is stored in memory or a register and must specify a desired segment register. Control for the destination operand 24 is identical in the preferred embodiment except that the destination operand cannot be immediate; it can only be direct.

The Index/No Index, Select Index Register, Memory/Register, Select Segment Register, Immediate, Direct, and Data Control Enable options for control of the data operand segment 20 are assigned to bits 16 through 23, respectively.

The Index/No Index, Select Index Register, Memory/Register, Select Segment Register, Immediate/Direct, and Data Control Enable options for control of the data operand segment 22 in the instruction segment 26 are assigned to bits 8 through 15 respectively.

The Index/No Index, Select Index Register, Memory/Register, Select Segment Register, and Data Control Enable options for control of the destination operand segment 24 are assigned to bits 0 through 7, respectively.

The above assignments of the instruction segment 26 are summarized in Table 3 below:

TABLE 3

| Bit | Assignment | Bit | Assignment |
|---|---|---|---|
| 0 | Index/No Index | 32 | FInfinity |
| 1,2 | Select Index Register | 33 | FNot a Number |
| 3 | Memory/Register | 34 | FUnnormal |
| 4,5 | Select Segment Register | 35 | FInexact |
| 6 | Data Control Enable | 36 | FInvalid Operation |
| 7 | Reserved | 37 | FDivide by Zero |
|  |  | 38 | FUnordered |
|  |  | 39 | Condition |
| 8 | Index/No Index | 40 | Condition |
| 9,10 | Select Index Register | 41 | Condition |
| 11 | Memory/Register | 42 | Condition |
| 12,13 | Select Segment Register | 43 | Condition |
| 14 | Immediate/Direct | 44 | Condition |
| 15 | Data Control Enable | 45 | Lock Bit |
|  |  | 46 | Reserved |
|  |  | 47 | Reserved |
| 16 | Index/No Index | 48 | Reserved |
| 17,18 | Select Index Register | 49 | Reserved |
| 19 | Memory/Register | 50 | Reserved |
| 20,21 | Select Segment Register | 51 | Reserved |
| 22 | Immediate/Direct | 52 | NOT; Add/Sub; Lft./Rt.; Sum/Prod.; Sum/Prod. |
| 23 | Data Control Enable | 53 | AND; Logical/Arithmetic |
|  |  | 54 | OR; Rotate |
|  |  | 55 | XOR; Sticky Right |
| 24 | Zero | 56 | Sum |
| 25 | Negative | 57 | Product |
| 26 | Overflow | 58 | Logic |
| 27 | Carry | 59 | Shift |
| 28 | FZero | 60 | Unpack |
| 29 | PNegative | 61 | Pack |
| 30 | FOverflow | 62 | Trap |
| 31 | FUnderflow | 63 | Escape |

A relative jump is performed with the an instruction designating the program counter register 80 as the destination operand 24 and one of the source operands 20. The other source operand 22 is an offset to be added to the program counter register 80, and the atomic instruction performed is an addition. Absolute or computed jumps may be performed similarly.

Atomic instructions are not normally accessed by a programmer. Instead the programmer uses an intermediate language interface, preferably the Teraplex Intermediate Language Interface (TILI), comprised of the instructions and addressing modes programmers and high level languages demand. A complete description of MISCHip software is publicly available in *TILI Reference Manual* (1990) by J. Glickman from Teraplex Inc., 701 Devonshire Drive, Champaign, Ill., and incorporated herein by reference. As shown in FIG. 7, the software architecture of the present invention takes a source language 230, such as C, and compiles it into an intermediate language such as the TILI instruction set 232. Next, the TILI program is compiled into the atomic instruction set 234. Thus, an executable program consists entirely of atomic instructions. The programmer, however, never has to write any code using atomic operations. Instead, he is free to use the TILI instruction set, or even a high-level language.

Figure 2:
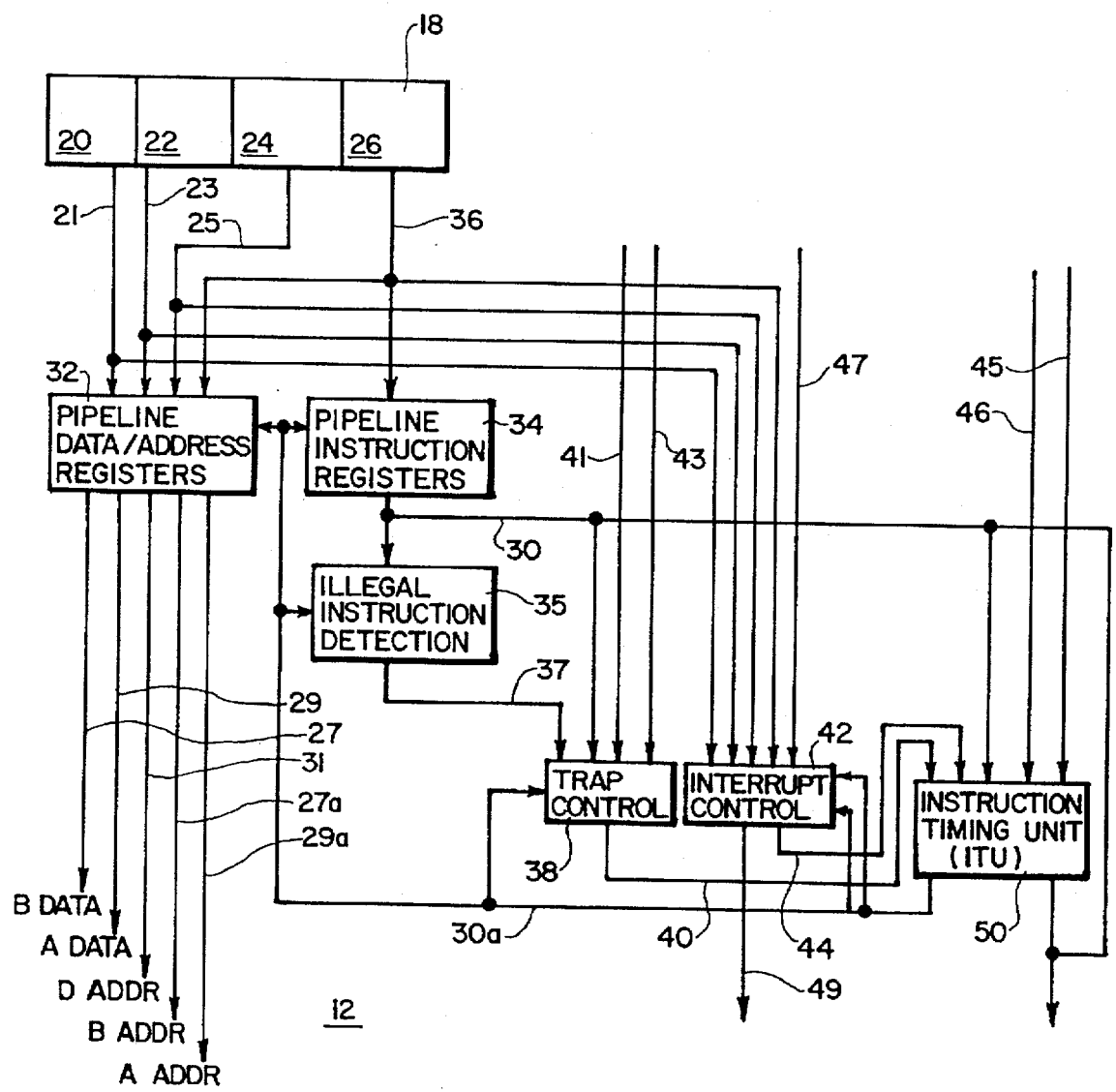
FIG. 2 is a block diagram representation of the control unit of the processor shown in FIG. 1.

FIG. 2 shows a block diagram representation of the control means of the present invention shown as the control unit (CU) 12. When the instruction control word 18 is fetched from memory, two source operand segments 20 and 22 and the destination operand segment 24 are applied to a pipeline data/address buffer register file 32 via lines 21, 23 and 25. Similarly, the instruction segment 26 of the instruction control word 18 is applied to a pipeline instruction register file 34 via a line 36. In accordance with a preferred embodiment, control signals from the instruction segment 26 enter an execution pipeline and shift down the execution pipeline. It will be understood that the present invention would also work, albeit somewhat slower, without an execution pipeline. At each stage of the pipeline, a specific bit portion of the instruction segment 26 provides control signals on line 30 to supply data through a desired portion of the arithmetic and logical elements of the UFU 14.

FIG. 2 also shows an instruction timing unit 50 of the CU 12. The instruction timing unit 50 is a state machine which receives control bits in the instruction segment 26 via the line 30, and an external clock via a line 46. The instruction timing unit 50 also receives asynchronous interrupt and trap signals from a trap control circuit 38 and an interrupt control circuit 42 via lines 40 and 44 as well as signals generated by the MMU 16 on a line 45. After combining the control signals with such information, the instruction timing unit 50 provides appropriate timing signals to the UFU 14 and to the MMU 16 via the line 30. The instruction timing unit also provides timing signals to other elements in the control unit 12 via a line 30a.

Another important feature of the present invention is that clocking in the processor 10 is, at least in the traditional sense, minimal. As an instruction from the instruction control word 18 begins executing, the instruction timing unit 50 enters a sequence of states that produces a clock pulse on the line 30 for a write pipeline register 78 (shown in FIG. 3) which receives the completed calculation from computation elements in the UFU 14 when the calculation of its inputs has been completed. In this manner, the flow-through cycle wherein an arithmetic, logical or control operation is performed is terminated by a synchronously clocked cycle. Accordingly, each instruction executes in minimal time, regardless of the amount of execution time required by other instructions.

The provision of clocking the system in this manner reduces the amount of wasted time while signals settle prior to a synchronous clock. In addition, this arrangement reduces the number of clock relative skews which are problematic in prior art systems.

FIG. 2 also shows an illegal instruction detection circuit 35 of control unit 12. The illegal instruction detection circuit 35 directly receives control signals from the instruction segment 26 located in the pipeline instruction register file 34 on the line 30 and, upon the detection of invalid instruction signals, provides an output signal to a trap control circuit 38 on a line 37 indicative of the detection of an invalid instruction.

The trap control circuit 38 receives a control bit signal from the instruction segment 26 on the line 30 corresponding to execution of the atomic trap instruction. The trap control circuit 38 also receives the output signal from the illegal instruction detection circuit 35 on the line 37; and index and segment bounds check information on data in the instruction control word 18 from the MMU 16 via a line 43. The trap control circuit thereafter operates to provide a signal on the line 40 to the instruction timing unit 50 indicative of an error trap or trap instruction.

An interrupt control circuit 42 is also provided in the control unit 12 to process interrupts to the processor 10. An interrupt is an event that occurs asynchronously to the execution of the processor 10. Typically, peripheral devices provide an interrupt request signal via a line 47, representing a significant change in the state of the peripheral device. The interrupt control circuit 42 also receives data from the two source segments 20 and 22 and destination segment 24 on lines 21, 23 and 25 as well as control signals from the instruction segment 26 on line 30. The interrupt control circuit 42 thereafter provides an output signal on line 44 to the instruction timing unit 50 and an interrupt acknowledge signal on a line 49.

It will be understood by those skilled in the art to which this invention pertains that reset circuitry may also be provided to reset the elements in the control unit 12 for initializing the processor 10.

Turning now to FIG. 3 and also to FIG. 1, therein is shown a block diagram representation of the functional unit means shown as the universal functional unit (UFU) 14. One important feature of the present invention is that the circuitry of the UFU 14 may be greatly simplified in comparison to the arithmetic logic units of prior art systems since the UFU 14 supports the streamlined instruction set. The UFU 14 receives the two source operand segments of data 20 and 22 of the instruction control word (ICU) 18 via lines 27 and 29 in a pipeline fashion and thereafter provides the functionality found in the arithmetic logic unit of traditional computers. The computational path of the data received by the UFU 14 on lines 27 and 29 is determined by bits in the instruction segment 26 applied to the control unit 12 which controls such paths in the UFU 14 via the line 30.

The UFU 14 contains arithmetic elements including an adder/subtracter circuit 60, a multiplier circuit 62, logical and shift elements shown as a logic/shift circuit 64, and a floating point unpacker 68, and floating point packer circuit 66 to perform floating point operations. The result of any arithmetic or logical operation of data received by the UFU 14 is latched to a write pipeline register 78 via a line 70. The write pipeline register 78 also receives control signals from the control unit 12 via line 30. Additionally, the UFU 14 contains a floating point register file 82 used to store intermediate results during floating point operations.

The UFU 14 also contains the processor status register 72 which provides information on the processor 10. The processor status register 72 receives status flag information from the computational elements in the UFU 14 on a line 74 and provides such information to the program counter 80 (shown in FIG. 4) as will be understood by those skilled in the art. The processor status register 72 communicates with other registers in the processor 10 via a register bus 77.

Inasmuch as all of the functional units are comprised of combinatorial circuitry, an arithmetic or logical operation will be performed concurrently with the receipt of data to the respective input lines 27 and 29. Accordingly, no clocking is applied to the functional units. Thus, for example, a result appears at the output line 70 of the adder/subtracter circuit 60 before a result at the output line 70 of the multiplier circuit 62. The propogation delay for any computational path is strictly a function of the gate delays and other intrinsic delays of the functional unit associated therewith.

The adder/subtracter circuit 60 accepts two 64 bit binary inputs on lines 27 and 29 and produces a 64 bit output at line 70. If subtraction is desired, then a subtraction mode bit is supplied by the instruction segment 26 to the adder/subtracter circuit 60 on line 30. One of the 64 bit data inputs received on line 27 is thereby complemented and then added to the other data input received on line 29.

The multiplier circuit 62 of the preferred embodiment is fully described in the copending application having Ser. No. 472,087, filed Jan. 30, 1990. As with the adder/subtracter circuit 60, the multiplier circuit 62 accepts two binary twos complement 64 bit data inputs from the source operand segments 20 and 22 via lines 27 and 29 and produces a 64 bit output at line 70 consisting of the least significant portion of the product. The multiplier circuit 62 does not manipulate carry bits from the partial product matrix during the course of addition to increase speed. Rather, the multiplier circuit 62 saves all carry bits until the final stage, where it adds the sum and carry word. While integer operations are performed directly by the adder or subtracter 60, multiplier 62 and logic/shift circuits 64, integer division is performed with a series of atomic operations.

The logic/shift circuit 64 receives two 64 bit binary inputs via lines 27 and 29 and produces a 64 bit output on line 70. The logic/shift circuit 64 performs six logic functions upon receipt of the appropriate control from the instruction segment 26: AND, OR, XOR, NAND, NOR and XNOR. The logic/shift circuit 64 also performs left and right arithmetic shifts, logical shifts, and circular shifts and a sticky right shift. Logic functions require two 64 bit inputs at lines 27 and 29 and produce single 64 bit result at line 70. The function desired is enabled by bits in the instruction control word 18. The shift operations require one 64 bit input and the shift amount and produce a 64 bit result.

The preferred embodiment of the present invention supports ANSI/IEEE 754 floating point computations with the use of circuitry shown as functional blocks 68 and 66 to provide a sequence of unpack and pack operations. Floating point computations take place completely on the main chip of processor 10 to eliminate an external floating point coprocessor. However, floating point computational speed could be increased with the addition of a floating point coprocessor. Two atomic instructions, floating point unpack (UNPACK) and floating point pack (PACK), make this possible. The floating point unpack instruction takes two floating point numbers and separates each of the floating point numbers into an integer mantissa and an integer exponent which are stored in the floating point register file 82. This unpack operation may be performed in one of two modes: unpack for floating point addition or unpack for floating point multiplication.

These integer values can be manipulated by the adder/subtracter 60, multiplier 62, or logic/shift circuits 64. After all the operations have been performed on the mantissas and exponents, the floating point packer circuit 66 combines the mantissa and exponent to form a new floating point word. Accordingly, a floating point operation will require the sequence of an unpack instruction, a sequence of integer instructions, and a pack instruction.

The floating point unpacker circuit 68 performs the first operation for floating point multiplication, addition, or subtraction. The unpacker circuit 68 accepts two floating point operands at lines 27 and 29 and produces integer quantities that are manipulated with the adder/subtracter circuit 60, multiplier circuit 62, and logic/shift circuits 64, as described above. A control bit from the ICW 18 provides the unpacker circuit 68 with an unpack instruction via control line 30a for either addition or multiplication.

Unpacking for addition consists of producing two signed mantissas, a biased exponent, and a shift count. The two signed mantissas are produced by merging the most significant bit and the 52 least significant bits of the original 64 bit word for each word.

Data representing a floating point number, as shown in FIG. 8, contains one sign bit 216, eleven bits for the exponent 218 and 52 bits for the mantissa 220. A floating point unpack operation for addition simply separates the mantissa from the exponent. The largest possible result from an addition of the two mantissas would be a 53 bit number: 52 bits in a new mantissa and a carry bit. The software of the present invention acknowledges the carry bit as fits its particular applications, e.g., by adjusting the exponent, shifting the mantissa to the right and setting the most significant bit; or by generating an overflow error.

Unpacking for multiplication produces four signed mantissa sections and two biased exponent values. For multiplication operations, the product of two 52-bit integers could be represented by as many as 104 bits. Therefore, the floating point unpacker circuit 68, upon receipt of a multiplication instruction, separates each mantissa into two 26-bit sections. The processor 10 performs the following four different multiplication calculations. First, the multiplier circuit 62 multiplies the least significant sections of the original mantissas. Next, it multiplies the most significant sections. Finally, it multiplies the most significant section by the least significant section for each operand. After shifting and adding operations, the result is a valid product wherein no bits are lost. If a fast multiplication is desired, then only two of the four 26-bit mantissa words are multiplied together and the exponents added.

Following the unpack operation, an atomic logical shift operation aligns the mantissas, if necessary. Then, as acquired, integer addition and multiplication operations are performed on the mantissas and exponents. The results of these integer manipulations are placed in the write pipeline register 78 via the line 70 and thereafter received on the register bus 77 for placement into registers in the floating point register file 82. The floating point packer circuit 66 thereafter receives the calculated mantissa and exponent words from the register bus 77 (which may access lines 27 and 29) to obtain a floating point result, and then produces a reconstructed floating point number on the line 70.

Preferably, a special case detector exists in the floating point unpacker circuit 68 to determine if a floating point number is not a number, infinite, or a zero. If any of these conditions occur, the appropriate floating point flag is set in the processor status register 72 via the line 74.

The bits in the flag portions of the processor status register 72 are set or cleared based on signals provided by the functional blocks 60, 62, 64, 66 and 68 of the UFU 14 on the line 74. The information provided on line 74 is indicative of the result of calculations in the UFU 14. Integer operations, for example, affect the integer flag bits: 0, negative, carry and overflow. Floating point pack and unpack operations affect the floating point flag bits: zero, negative, overflow, underflow, infinity, not a number, a normal inexact, invalid operations, unordered and division by zero. Flags may be disabled by resetting the flag enable bits in the instruction control word 18. This will leave the flags unaffected by operations performed by the UFU 14.

Figure 4:
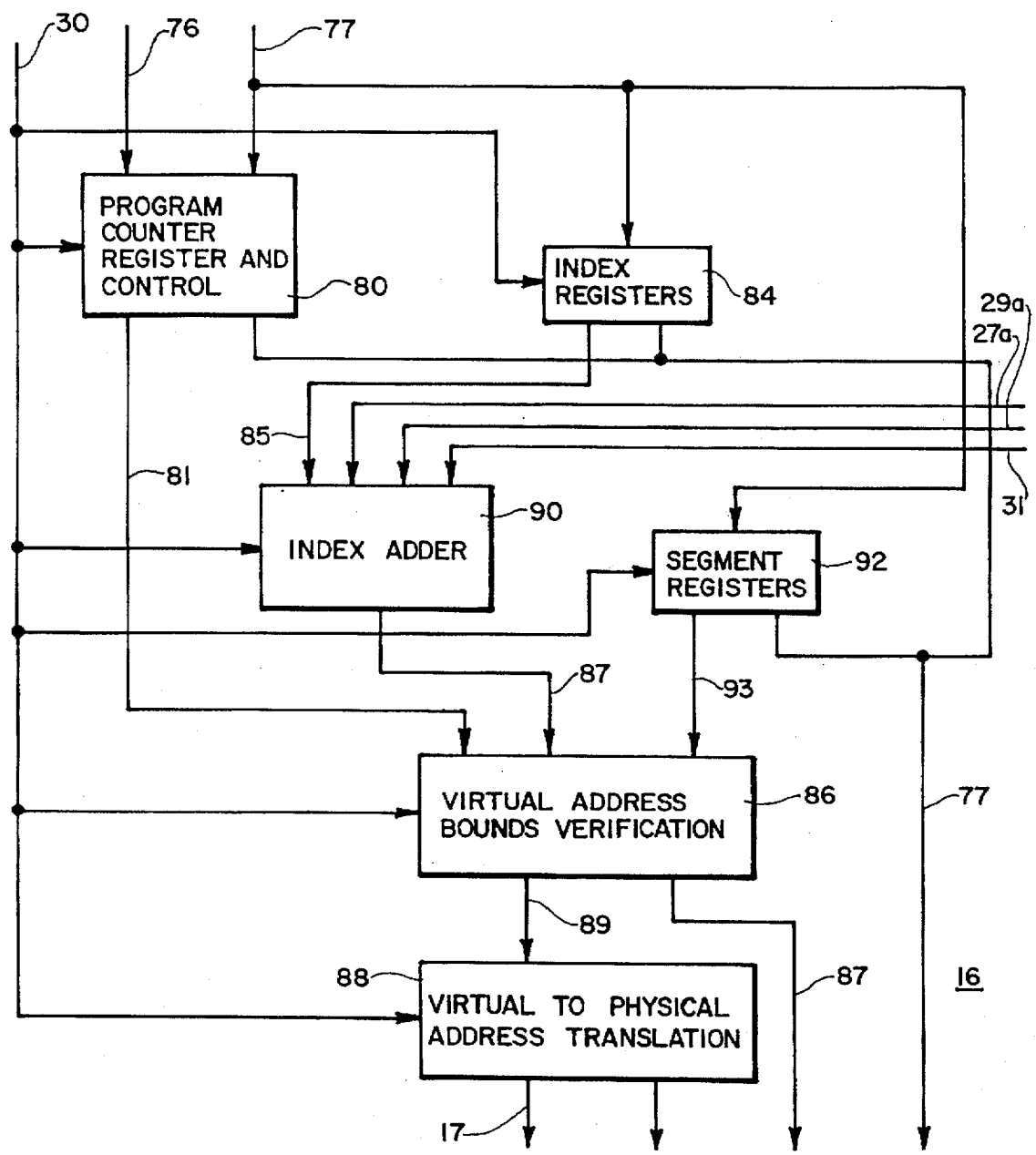
FIG. 4 is a block diagram representation of the memory management unit of the processor shown in FIG. 1.

FIG. 4 shows the memory management means in accordance with the present invention, shown as the memory management unit (MMU) 16. The MMU 16 provides an interface between the processor 10 and user memory. The MMU 16 comprises a program counter register 80, and index registers 84. The MMU 16 also comprises an index adder circuit 90, segment registers 92, a bounds verification circuit 86 and a virtual to physical address translation circuit 88.

Another feature of the present invention is that the processor 10 does not have general purpose registers. The present invention contemplates use of a high speed cache memory architecture, to achieve the same performance with memory references that traditional computers achieve with registers. Accordingly, frequently accessed data items are in the cache and can be retrieved from there as quickly as they can from an internal register. It will be understood, of course, that many different memory architectures may be utilized with the present invention.

Performance of the present invention, however, depends on its entire support system. For example, if the processor has a very rapid processing speed, but the memory system causes wait states due to access-time restrictions, processor performance is meaningless. Therefore, the present invention involves integrating a very high speed computing machine into a high speed memory system architecture.

The processor 10, however, does have special purpose internal registers directly accessible to the user: the program counter 80, index registers 84, segmentation registers 92, the floating point register file 82 (shown in FIG. 3), and the processor status register 72 (also shown in FIG. 3). These registers are directly accessible to the user for reading or writing over a register bus shown as line 77.

The program counter register 80 contains the address of the next instruction to be fetched from memory into the instruction pipeline. The next value of the program counter 80 is determined by the MMU 16 based on contents of the instruction control word 18 provided by the line 30 and the contents of the processor status register 72. In the preferred embodiment, the program counter 80 is automatically incremented after each instruction fetch, unless a jump, trap or interrupt instruction is received.

A dedicated address provides a common entry point for all trap instructions, and a separate dedicated address for all interrupt instructions. When a trap or interrupt instruction is received, the appropriate address is automatically placed in the program counter 80 so that execution begins at the correct entry point. The contents of the program counter 80 are forced to zero upon reset of the processor 10.

The index registers 84 hold values that are used in indexed addressing mode. This addressing mode calculates a virtual address by adding the contents of an index register and the contents of the operand's address field in a 256 bit instruction word. The index registers can be read and written over the register bus 77.

Preferably, one of the index registers is a Z index register used to add zero to the contents of the operand address field if an index addition from the index registers is not needed. This is a read-only register.

A stack pointer is another index register. It is used to implement a last-in first-out (LIFO) stack in memory as will be appreciated by those skilled in the art.

In addition, a frame pointer register is a spare index register that may be used by a compiler such as TILI as a frame pointer to ease stack frame references.

The processor 10 of the preferred embodiment has memory segmentation to restrict the virtual address base that programs may access. The segmentation scheme differs from that used in most traditional computers, which usually require adding the contents of a segment register to the address. The method used in the processor 10 is much faster because this addition is not required. The address comparison takes place in parallel with paging, so that they effectively are accomplished in zero time.

The processor 10 also has four pairs of segment registers 92 that are used for virtual address segmentation. These segment registers 92 can be read and written over the register bus 77.

The index adder circuit 90 also receives control from the control unit 12 on the line 30 to perform appropriate indexing operations on the addresses of source operand segments 20 and 22 and the destination operand segment 24, received on lines 27a, 29a, and 31 respectively. The index adder 90 also performs operations on data received from the index register file 84 on the line 85. The index adder thereafter produces an output on a line 87 for bounds verification.

The bounds verification circuit 86 receives an output from the segment register file 92 on a line 93 specifying the virtual addressing bounds. Such information is based on control bits in the operand address control section 206 of instruction segment 26 provided on the line 30. If such a comparison produces an illegal memory reference, an appropriate output signal is provided to the trap control circuit 38 on the line 87.

Otherwise, a signal provided by the bounds verification circuit 86 on a line 89 is received by the virtual to physical address translation circuit 88. As with other elements in the MMU 16, the translation circuit receives control on the line 30 provided by control bits in the instruction section 26. The address translation circuit thereafter addresses the physical location in memory on a line 17.

Paging is the process of converting virtual addresses to physical addresses. The MMU 16 performs paging with the use of virtual address as a key into a page table that is implemented with a content addressable memory. If the key is matched, the associated data is the physical address. Otherwise, a page fault trap signal appears on line 43, and the operating system must update the page table to contain an entry for the new virtual address. For greatest efficiency, two identical page tables are preferred. This eliminates contention for page tables.

Figure 5:
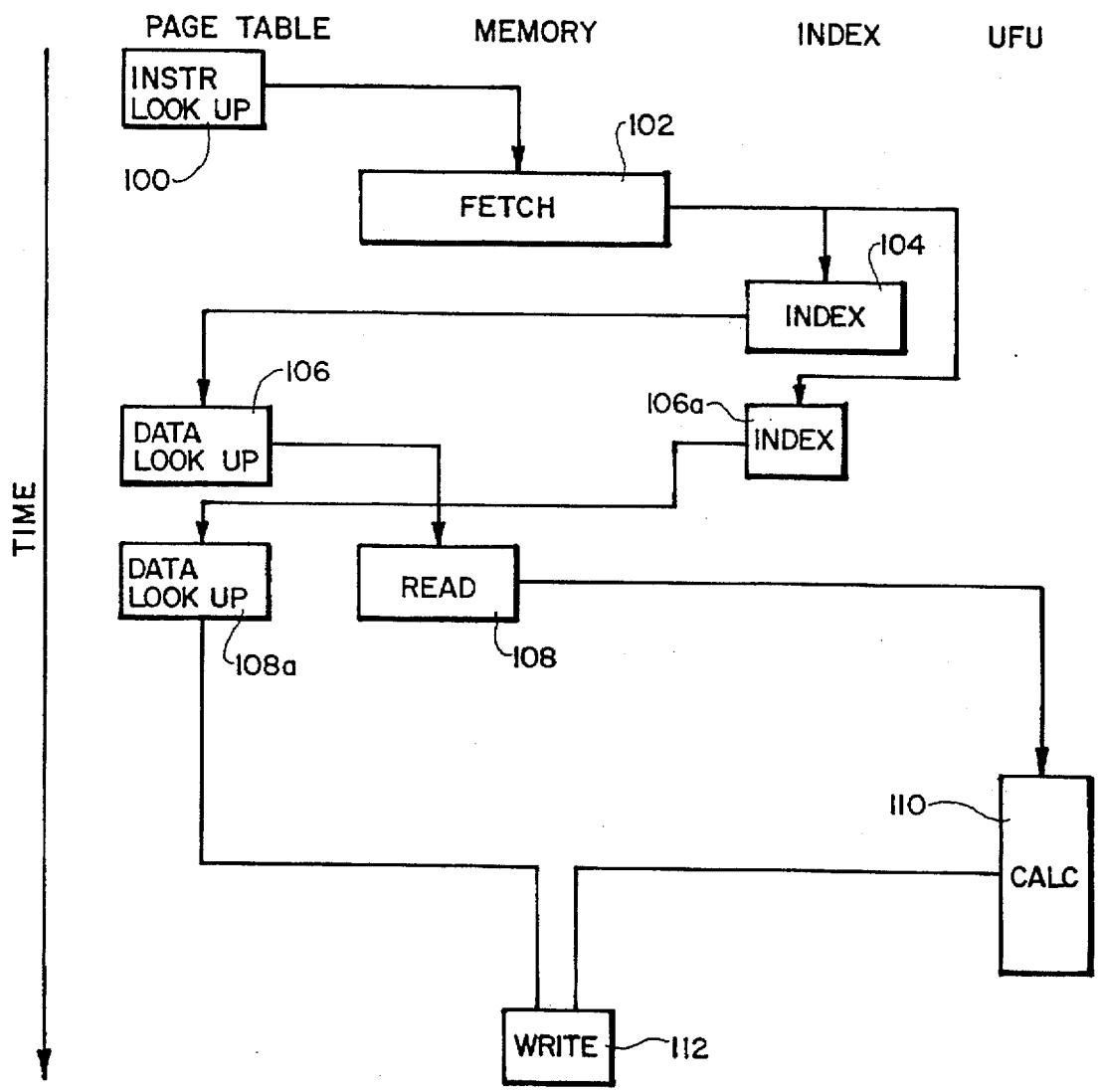
FIG. 5 is a single instruction pipeline flow diagram of an instruction provided by the control unit of FIG. 2.

FIG. 5 shows one important feature of the CU 12, providing an execution pipeline to the UFU 14. It will be appreciated that use of the pipeline hereinafter described is only one implementation of the present invention inasmuch as the processor 10 will function somewhat slower without use of a pipeline. In addition, other methods for constructing an execution pipeline will occur to those skilled in the art to which this invention pertains. Accordingly, in a single pipeline instruction flow in accordance with one embodiment, each instruction passes through seven stages: a page table lookup for instruction stage 100, an instruction fetch from memory stage 102, an index stage 104, a page table lookup for operand addresses and destination index stage 106, an operand fetch from memory and data lookup stage 108, a calculation stage 110, and a result write to memory stage 112.

During the page table lookup for instruction fetch stage 100, the execution address in the program counter register 80 is looked up in the page table. When in user mode, the execution address is compared against contents of segmentation registers which contain boundary values. At the completion of this first lookup stage 100, a physical address is ready to be used for a long word mode memory fetch.

During the instruction fetch from memory stage 102, a long word mode memory access fetches the next instruction control word 18 (shown in FIG. 1) from memory. The instruction control word 18 consists of four 64 bit pieces: the instruction opcode segment 26, the destination operand 24, and the two source operand segments 20 and 22. The source operand segments 20 and 22 may be immediate, direct, index, or register.

During the index stage 104, indexing is performed in parallel on the source operand segments 20 and 22. Bits in the instruction control word 18 specify whether the addressing mode is direct or indexed. In the latter case, additional bits specify which index register is to be used. If the addressing mode is direct, indexing is performed by adding zero. At the completion of the index stage 104, virtual addresses are available for the operands 20 and 22.

During the data lookup 106 for operand addresses, the virtual addresses of the operand segments 20 and 22 are looked up in the page tables. If a two page table design is used, this can be done in parallel. In user mode, each virtual address is also compared with the bounds in the segment register set specified by bits in the instruction control word 18. This comparison is done in parallel with the page table lookups.

Additionally, the destination address is indexed during this stage. Bits in the ICW 18 specify the desired index register. At the completion of this stage 106, physical addresses are available for the source operand segments 20 and 22 and the destination operand virtual address 24 has been completed.

During the operand fetch from memory stage 108, the source operand segments 20 and 22 are fetched from memory in short word mode. The amount of time required for this operation is determined by the amount of contention for memory banks that exist between operands. At the conclusion of this stage, both source operands 20 and 22 are available to the UFU 14 for manipulation thereon.

In this stage, the destination virtual address is also looked up in the page table, and compared with segment register set information provided by the ICW 18. In this manner, the destination physical address is read to be used for write back.

During the calculation stage 110, the calculation specified by the instruction segment 26 of the instruction control word 18 is performed. When the calculation is completed, the result is latched into the write pipeline register 78.

During the result write to memory stage 112, the contents of the write pipeline register 78 are written to memory. The page and table lookup and segment bounds check for the destination address were performed in the page table lookup stage 108a, and the physical address has been saved for use in this stage 112.

If one of the source operands 20 or 22 is immediate, the value bypasses the index stage 104, the page table lookup stage 106 and the read stage 108 and is held in a register until it is needed in the calculation stage 110. If one of the source operands is a processor register, the contents of that register are provided to the UFU 14 at the beginning of the calculation stage 110.

It is contemplated that the present invention will provide a multiple instruction pipeline flow which is deemed to be within the skill of the art to which this invention pertains. According to the present invention, the instruction pipeline allows five separate instructions to be in various stages of completion at a given time. Such a multiple instruction pipeline flow enhances the high performance of this invention. The processor instruction pipeline consists of two phases.

A novel computing system architecture meeting the aforestated objects has therefore been described. The invention provides for a minimal instruction set which results in reduced hardware complexity. Unencoded instructions are fetched from memory in a very long instruction word to provide bits which directly stimulate control lines in the hardware. It will be understood by those skilled in the art to which this invention pertains that various modifications may be made in the details and arrangements of the processes and of the structures described herein in order to explain the nature of the invention without departing from the principles of the foregoing teachings. Accordingly, the invention will only be limited as expressed in the appended claims.

What is claimed is:

1. A method for manipulating data in a general purpose digital computing system having memory means, central processing means, and a bus network interconnecting said central processing means and said memory means, comprising the steps of:

providing a minimal executable instruction set for functioning said digital computing system;

locating an unencoded instruction control word in said memory means having first and second source operand portions, a destination operand portion and an instruction portion having preselected bit portions therein attributable to said minimal instruction set;

assigning said preselected bit portions of said instruction portion of said unencoded instruction control word for directly controlling computational paths in said central processing means;

applying ones of said preselected bit portions of said instruction portion of said unencoded instruction control word to said central processing means for directing data attributable to said source operand portions through a selected one of said computational paths to provide a result therefrom; and storing said result in a memory location defined by said destination operand portion.

2. The method of claim 1 wherein said step of applying further comprises the step of:

synchronously latching said result into write register means upon completion of said result.

3. The method of claim 2 wherein said source operands of data are directed through said preselected computational path independent of synchronous clocking means.

4. A digital computing system for implementing a minimum instruction set having main memory, central processing means, and a bus network interconnecting said memory and said central processing means, said central processing means comprising:

memory management means for locating an unencoded instruction word having first and second source operands of data and an instruction portion having bit portions attributable to said minimum instruction set in said memory and supplying data to said memory;

functional unit means having a plurality of computational elements for performing arithmetic and logic operations on source operands of data supplied thereto;

control means directly responsive to said instruction bit portions for providing control signals attributable to said bit portions to said functional unit means and to said memory management means;

adder/subtracter circuit means responsive to said instruction bit portions for receiving said two source operands of data and for performing addition subtraction operations thereon and providing an output;

multiplier circuit means responsive to said instruction bit portions for receiving said two source operands of data and for performing multiplication operations thereon and providing an output;

logic/shift circuit means responsive to said instruction bit portions for receiving said two source operands of data and for performing logical and shifting operations thereon and providing an output; and floating point computational circuit means responsive to said instruction bit portions for receiving said two source operands of data and for performing floating point operations thereon and providing an output wherein said functional unit means further comprises write register means responsive to a synchronous signal provided by said control unit means and coupled with said adder/subtracter circuit output, said multiplier circuit output, said logical/shifter circuit output and said floating point computational cicuit output for storing the computational results therefrom.

5. A digital computing system for implementing a minimum instruction set having main memory, central processing means, and a bus network interconnecting said memory and said central processing means, said central processing means comprising:

- memory management means for locating an unencoded instruction word having first and second source operands of data and an instruction portion having bit portions attributable to said minimum instruction set in said memory and supplying data to said memory;
- functional unit means having a plurality of computational elements for performing arithmetic and logic operations on source operands of data supplied thereto;
- control means directly responsive to said instruction bit portions for providing control signals attributable to said bit portions to said functional unit means and to said memory management means;
- adder/subtracter circuit means responsive to said instruction bit portions for receiving said two source operands of data and for performing addition or subtraction operations thereon and providing an output;
- multiplier circuit means responsive to said instruction bit portions for receiving said two source operands of data and for performing multiplication operations thereon and providing an output;
- logic/shift circuit means responsive to said instruction bit portions for receiving said two source operands of data and for performing logical and shifting operations thereon and providing an output; and
- floating point computational circuit means responsive said instruction bit portions for receiving said two source operands of data and for performing floating point operations thereon and providing and output wherein said floating point computational circuit means comprises:
    - unpack circuit means responsive to said instruction bit portions for separating said source operands of data indicative of floating point data into integer exponents and integer mantissas; and
    - pack circuit means responsive to said instruction bit portions for forming a floating point result from said integer exponents and integer mantissas upon manipulation thereon by said adder/subtracter circuit means, said multiplier circuit means, and said logic/shift circuit means.

6. A method for manipulating data in a general purpose digital computing system comprising the steps of:
- providing unencoded instruction control words in first a memory, each instruction control word having first and second source operand portions, a destination operand portion and an instruction portion, the instruction portion having preselected bit portions;
- providing a central processor having a plurality of computational paths;
- applying said unencoded instruction control word in said first memory to the central processor;
- directing the first and second source operands through a computational path of the central processor, the computational path being determined by the bits in the instruction portion of said unencoded instruction control word based upon the values of the preselected bit portions of the instruction control word; and
- storing the result in a location of second memory determined by the destination operand portion of the instruction word.

7. A method for manipulating data in a general purpose computing system utilizing a minimal executable instruction set comprising the steps of:
- providing at least one instruction unencoded control word in memory, said instruction unencoded control word having a first and second source operand segment, a destination operand segment and an instruction segment, wherein the first and second source operand segments contain information in either one of the form of data and addresses, the destination operand segment contains information in the form of an address and the instruction segment includes a plurality of instruction bits;
- providing a central processor having a plurality of computational paths for performing a plurality of computations and a plurality of control lines for communicating with the plurality of computational paths;
- assigning each instruction bit in the instruction segment of said instruction unencoded control word to a particular computational path wherein the instruction bit determines which computational path has been selected thereby directing the first and the second source operand segments through the selected computational path to produce a result; and
- storing the result in the address defined by the destination operand segment.

8. A digital computing system having main memory, a central processor and a bus network interconnecting the main memory and the central processor, the central processor comprising:
- a memory manager for locating an unencoded instruction control word from the main memory, said unencoded instruction control word having a first and a second source operand of data, a destination operand of data and an instruction operand, the instruction operand having a plurality of bits for controlling the flow of data through the central processor;
- a functional unit having a plurality of computational elements for performing arithmetic and logic operations on the first and second source operands of data;
- control means directly responsive to the plurality of bits in the instruction operand of said unencoded instruction control word for selecting at least one computational element of the functional unit and supplying the first and second source operands thereto,
- wherein the computational elements of the functional unit include:
    - an adder/subtractor circuit;
    - a multiplier circuit;
    - a logic/shift circuit;
    - a floating point computational circuit; and
- wherein the floating point computational circuit includes:
    - an unpack circuit responsive to the bits of the instruction operand for separating data contained in the first and second source operands into integer exponents and integer mantissas; and
    - a pack circuit responsive to the bits of the instruction operand for forming a floating point result from the integer exponents and integer mantissas created by the unpack circuit.

* * * * *

UNITED STATES PATENT AND TRADEMARK OFFICE
CERTIFICATE OF CORRECTION

PATENT NO. : 5,675,777
DATED : October 7, 1997
INVENTOR(S) : Jeff Bret Glickman

It is certified that error appears in the above-identified patent and that said Letters Patent is hereby corrected as shown below:

On the Title Page

In column 2, after line 1, please insert:

--4,586,127   04/1986   Horvath   395/375--.

In column 2, after line 14, please insert:

--4,914,581   04/1990   Talgam et al.   395/375--.

In the Claims

In claim 4, line 20, please change "addition subtraction" to --addition or subtraction--.

In claim 5, line 30, please insert --to-- after "responsive".

In claim 5, line 33, please change "providing and" to --providing an--.

UNITED STATES PATENT AND TRADEMARK OFFICE
CERTIFICATE OF CORRECTION

PATENT NO. : 5,675,777
DATED : October 7, 1997
INVENTOR(S) : Jeff Bret Glickman

It is certified that error appears in the above-indentified patent and that said Letters Patent is hereby corrected as shown below:

In the Claims (cont'd)

In claim 6, line 20, please insert --control-- before "word".

In claim 7, line 4, please delete "control".

In claim 7, line 5, please delete "control".

In claim 7, line 19, please delete "control".

Signed and Sealed this

Seventeenth Day of April, 2001

Attest:

NICHOLAS P. GODICI

*Attesting Officer*     *Acting Director of the United States Patent and Trademark Office*